United States Patent Office 3,215,653
Patented Nov. 2, 1965

3,215,653
RESORCINOL-MODIFIED PHENOLIC RESIN
ADHESIVE MIX
Gilbert S. Hughes, Sarver, Pa., assignor to Koppers
Company, Inc., a corporation of Delaware
No Drawing. Filed July 27, 1962, Ser. No. 213,001
3 Claims. (Cl. 260—17.2)

This invention relates to an improved adhesive that will bond softwood veneer into plywood at shorter press times and at lower temperatures than commercial phenolic resin adhesives. In one specific aspect, it relates to a novel resorcinol-modified phenolic resin hot-cooked adhesive mix capable of bonding veneer into plywood in as little as five minutes at 285° F. to give a bond meeting the wood failure specifications for exterior-grade adhesives set forth by the Douglas Fir Plywood Association.

For many years phenol-formaldehyde resins, which have the valuable property of producing extremely weather-resistant bonds between wood veneers, have been used in preparing glues capable of bonding softwood veneers to form exterior waterproof glue lines. Unfortunately, adhesives made from these resins are subject to the drawbacks of requiring press temperatures of about 300° F. and press times of ten minutes or more to provide a waterproof bond of sufficient strength. High press temperatures tend to weaken the outer surfaces of the wood panel and long press times adversely affect the economics of plywood manufacture. The phenol-formaldehyde resin adhesives have additional inherent limitations; these adhesives are not effective for bonding veneer of greater than about 4% moisture content and are not dependable if the closed assembly time prior to hot pressing is greater than twenty minutes. The closed assembly time is particularly significant if the ambient temperature reaches 85–85° F. Commercial producers of phenol-formaldehyde resin adhesives warn the plywood manufacturers that on hot days they must speed up and get the panels into the press or use a heavy spread, since the phenolic glue at temperatures above 80° F. will dry out and provide only an unsatisfactory crumbling glue line.

U.S. Patent 2,489,336 of Raymond J. Spahr et al. describes a method designed to overcome the disadvantages of the phenol-formaldehyde adhesives by modifying the phenolic adhesive with resorcinol. According to Spahr et al., adhesives can be prepared by mixing a phenolic resin powder of relatively high alkalinity, resorcinol, paraformaldehyde, walnut shell flour and water and stirring the solution until a homogeneous mix is obtained. Although these adhesives have certain excellent properties, they are limited with respect to their performance when used at longer closed assembly times and for bonding veneers of high moisture content.

I have discovered an unexpectedly superior resorcinol-modified phenolic resin adhesive mix which provides a waterproof bond meeting the wood failure specifications of the DFPA when pressed using especially short press times and low temperatures. The novel adhesive mix shows remarkable effectiveness for bonding wet veneer, i.e. veneer having a moisture content of 8–12% by weight. The new adhesive also functions well at closed assembly times of thirty minutes, whereas most commercial adhesives are not effective if the closed assembly time exceeds twenty minutes.

It is, therefore, an object of the present invention to provide a novel resorcinol-modified phenol-formaldehyde resin adhesive mix that will bond veneer into plywood at short press times and at comparatively low temperatures. It is a further object to provide an adhesive which can be used with longer closed assembly times and with veneers of relatively high moisture content.

In accordance with the invention, one part by weight resorcinol is heated with a gap-filling quantity of a formaldehyde-reactive filler in an aqueous alkaline medium having a pH of at least 12 at an elevated temperature below the boiling point of the reaction mixture. This reaction mixture is then reacted with 3 to 7.33 parts by weight of a low-alkaline, low-condensed phenol-formaldehyde resin in aqueous solution, the resin solution being characterized by a pH of 8–11 and a viscosity of 200–3000 cps. at 23° C. Water of dilution is added at various points during the formulation in an amount sufficient to provide a final adhesive mix having a resin solids content of 18–26% by weight.

In a preferred embodiment of the invention, a resorcinol-containing phenolic resin adhesive mix, characterized by a viscosity of 1500–7000 cps. at 23° C., a pH of 10–12 and a total resin solids content of 18–26% by weight is prepared according to the following schedule:

(a) An aqueous alkaline solution is provided containing sufficient caustic to provide a final resin adhesive mix of pH 10–12, the amount of water present in the solution being sufficient to provide a stirrable mixture during the formulation of the mix.

(b) A formaldehyde-reactive filler is then added in a gap-filling quantity (i.e. 33–67% by weight based on the weight of the total resin solids of the final adhesive mix.

(c) Soda ash is then added in an amount sufficient to lower the pH of the mix and to cream out the mix, i.e. thin out the mix to a creamy consistency, upon the addition of water of dilution.

(d) Resorcinol is then added in an amount of 12–25% by weight based upon the weight of the total resin solids of the final adhesive mix.

(e) The resulting mixture is allowed to react at an elevated temperature below the boiling point of the mixture.

(f) There is then added an aqueous solution of a low-alkaline, low-condensed phenol-formaldehyde resin, the resin solution being characterized by a pH of 8–11 and a viscosity of 200–3000 cps. at 23° C., the amount of resin being 75–88% by weight based on the weight of the total resin solids of the final adhesive mix.

(g) The resulting mixture is allowed to react at an elevated temperature below the boiling point of the mixture.

(h) The mixture is cooled to ambient temperature to form a water-insoluble, infusible resin during the curing of the adhesive. The total water of dilution added during the foregoing sequence of steps is that amount required to provide a final adhesive mix having a resin solids content of 18–26% by weight.

In a futher modification a resorcinol-containing phenolic resin adhesive mix, characterized by a viscosity of 1500–7000 cps. at 23° C., a pH of 10–12 and a total resin solids content of 18–26% by weight is prepared according to the following schedule:

(a) An aqueous alkaline solution is provided containing sufficient caustic to provide a final resin adhesive mix of pH 10-12, the amount of water present in the solution being sufficient to provide a stirrable mixture during the formulation of the mix.

(b) An amylaceous extender is added in an amount of up to about 10% by weight, based on the weight of the total resin solids of the final adhesive mix.

(c) Water of dilution is added to increase the stirrability of the mixture.

(d) A formaldehyde-reactive filler is then added in a gap-filling quantity, i.e. 33-67% by weight based on the weight of the total resin solids of the final adhesive mix.

(e) Soda ash is then added in an amount sufficient to lower the pH of the mix and to cream out the mix, i.e. thin out the mix to a creamy consistency, upon the addition of water of dilution.

(f) A defoamer is added in an amount of about 0.5-1% by weight based upon the weight of total resin solids in the final adhesive mix.

(g) Water of dilution is then added, if desired, to thin out the mix.

(h) Resorcinol is then added in an amount of 12-25% by weight based upon the weight of the total resin solids of the final adhesive mix.

(i) The resulting mixture is allowed to react at an elevated temperature below the boiling point of the mixture.

(j) Formaldehyde is added to link up the mix, the amount of formaldehyde being ⅓-¼ of the total formaldehyde added during the formulation.

(k) There is then added an aqueous solution of a low-alkaline, low-condensed phenol-formaldehyde resin, the resin solution being characterized by a pH of 8-11 and a viscosity of 200-3000 cps. at 23° C., the amount of resin being 75-88% by weight based on the weight of the total resin solids of the final adhesive mix.

(l) The resulting mixture is allowed to react at an elevated temperature below the boiling point of the mixture.

(m) The mixture is cooled to ambient temperature, and (n) There is added sufficient formaldehyde to form a water-insoluble, infusible resin during the curing of the adhesive. The total water of dilution added during the foregoing sequence of steps is that amount required to provide a final adhesive mix having a resin solids content of 18-26% by weight.

The bonding of fir veneer into plywood in a hot press is dependent primarily on the resin solids content of the adhesive mix used and secondarily on the viscosity of the mix. If the amount of gluing agent, i.e. resin solids, in the mix is insufficient, the mix will not bond; the plywood simply falls apart when it is removed from the press. When the resin solids content of the adhesive is optimum, the glue must have correct mobility, as determined by viscosity, when the bonding occurs. If the glue is too mobile, it will be either squeezed out of the bond or squeezed too far into the wood. In either case, the result is a starved glue line which, in effect, is equivalent to having insufficient gluing agent present. If the viscosity is too high, the glue becomes immobile and simply sets on the surface of the veneer where it cures with no penetration. The result is a dry, crumbling glue line, characterized by delamination out of press or a cohesive failure in the glue itself with a bond of little or no strength or wood failure.

The resorcinol-containing phenolic resin adhesive mix of the invention is characterized by a total resin solids content of 18-26% by weight and a viscosity of 1500 to 700 cps. when measured at 23° C. If the resin solids content is below 18% by weight, insufficient gluing agent is present to provide a water proof bond. No advantage is seen in a resin solids content of above 26% by weight. The viscosity of the novel adhesive is between 1500 to 7000 cps. at 23° C. Below 1500 cps. the mix is too mobile and above 7000 cps. it has insufficient mobility.

The pH of the final resin adhesive mix is critical and must range between 10 and 12. If the pH is too low, viz. below 10, the reactivity of the mix is too slow and the ultimate bond will not hold using short press times and low temperatures. If the pH is too high, viz. over 12, the bond will be too fast and pre-cure before it bites; in other words, the glue cures before it has time to penetrate.

It is essential for purposes of the invention to use a low-alkaline, low-condensed phenol-formaldehyde resin. The low alkalinity of the resin is best defined in the terms of the pH of the resin solution, while the degree of condensation can best be expressed as viscosity.

The pH of the resin solution should be in the range of 8-11. This pH can ordinarily be achieved by adding to the charge (during the preparation of the phenolic resin) 3 to 6% by weight sodium hydroxide based on the weight of phenolic resin solids.

The degree of condensation is materially affected by both alkalinity and heat. If the pH is high, the condensation is very rapid; at about pH 12 the condensation is too rapid and the viscosity of the solution becomes difficult to control. A pH of 9-10 represents optimum working conditions, since at this pH the mixture of phenol, formaldehyde and caustic can be heated to reflux to form a homogeneous resin syrup and, on cooling, the viscosity remains within a workable range. The viscosity of the phenolic resin solutions useful in the prepartion of the adhesives of the invention ranges between 200 and 3000 cps. at 23° C. The resin solids content of such solutions should be between 40 and 60%, although a proportional adjustment in the adhesive mix can be made for a solids content outside of this range.

Ordinarily, the mole ratio of phenol to formaldehyde in the phenolic resin varies between one mole of phenol per 1.4-2.2 moles of formaldehyde. A resin having a ratio of one mole of phenol per 1.6-2 moles of formaldehyde is preferred.

In the foregoing embodiments for preparing the novel resorcinol-modified resin adhesive mix of the invention, the following specific conditions and relationships should be observed:

The formulation is initiated by providing an aqueous alkaline solution, adjusted to the proper degree of alkalinity using a suitable non-volatile alkali, such as caustic soda or caustic potash. The alkalinity is such as to provide a resin adhesive mix of pH 10-12 after the addition of the other ingredients. After the addition of the caustic, the heat of solution raises the temperature to 40-50° C. The initial aqueous alkaline solution has a pH of above 13, preferably about 13.5 at 47° C.

At this point in the formulation there may be added a minor proportion of an amylaceous extender, such as wheat flour, dry wall paper paste, and the like. The extender is added to smooth out the adhesive mix. The amount added can be varied as desired, but in any event, the maximum amount should not exceed 10% by weight based on the total resin solids, according to DFPA specifications. During the addition of the extender, the temperature of the mix is raised to a mildly elevated temperature, e.g. 50-65° C., with stirring for a period of about ten minutes. Heating the solution containing the amylaceous extender serves to hydrolyze the starch and to cream it out into a thin paste.

If an extender is used in the formulation, it is sometimes helpful to add water of dilution at this point. If required, sufficient water should be added to provide a stirrable mix upon the addition of the formaldehyde-reactive filler.

A formaldehyde-reactive filler is added to the formulation in a gap-filling amount to bridge and reinforce the resin solids on the glue line, particularly with veneer, which is relatively rough in surface appearance. Suitable formaldehyde-reactive fillers include the powdered walnut shell fours, available commercially as Glufil HL and Glufil WF7A, and the powdered bark extracts obtained from western hemlock, Douglas fir, western white fir, Sitka spruce, eastern hemlock and southern yellow pine. Particularly useful is the powdered bark extract of Douglas fir, sold commercially as Silvacon 472. The formaldehyde-reactive filler is present in an amount ranging between about 33 and 67% by weight, based upon the weight of total resin solids in the final adhesive mix. If too much filler is used, the final mix becomes too viscous, whereas too little filler does not sufficiently reinforce the resin solids during gluing. During the addition of the filler the temperature of the mix is conveniently maintained at a temperature between about 50–60° C. and below the boiling point of the mix, preferably between about 75–85° C.

After the formaldehyde reactive filler is added, the formulation is a dry, crumbling mix. Soda ash is then added in an amount sufficient to lower the pH of the mix and to cream out the mix upon addition of the water of dilution. The addition of the soda ash in the required amount, i.e. about 5–20% by weight based upon the weight of total resin solids, reduces the pH of the mix to below about 13. The use of about 10% by weight soda ash, based on the weight of total resin solids, is preferred. The temperature at this point in the formulation is between about 50 and 98° C., preferably between about 80 and 90° C.

A defoamer may be added to the formulation at this point to reduce the foaming action of the mix. Suitable defoamers include diesel oil, pine oil, stove oil, fuel oil, and the like. The defoamer is generally used in an amount ranging between 0.5 and 1% by weight based upon the weight of total resin solids in the final mix.

If required, water of dilution is added to control the viscosity of the mix and to render the mix more stirrable upon the addition of resorcinol. The addition of water of dilution can be omitted at this point if sufficient water is present in the initial aqueous alkaline solution or is added after the optional addition of the amylaceous extender. The mix at this point has a pH of about 9.5–11.5 and a viscosity of about 12,000 to 24,000 cps. at 23° C.

Resorcinol is now added to the mix in an amount ranging between 12 and 25% by weight, preferably about 15% by weight, based upon the weight of the total resin solids. The addition of resorcinol at this point in the formulation is critical, as is shown by Examples IV, V, VI and VII. Some of the formaldehyde used in the formulation may be added prior to the addition of the phenolic resin. This formaldehyde may be added as free formaldehyde along with the resorcinol, or in the form of low-condensed resorcinol-formaldehyde resin made by pre-reacting resorcinol and formaldehyde. If too much resorcinol, i.e. greater than 25% by weight, is used in the formulation, the mix becomes too reactive and thus will pre-cure. If too little resorcinol is used, the press time has to be increased, since the curing speed is too slow. After the addition of the resorcinol, the mix is heated to an elevated temperature between 50° C. and below the boiling point of the reaction mixture, preferably at a temperature between about 80–90° C., for a time sufficient to allow the resorcinol to react with the alkali and convert the resorcinol to its sodium salt. This is generally accomplished in a period of 5 to 15 minutes. The formulation at this point has a pH of about 11.5–12.5 at 80° C. and a viscostiy of about 20,000 to 28,000 cps. at 23° C.

As noted hereabove, a portion of the total formaldehyde, either in the form of paraformaldehyde, 37% Formalin or as part of a resin formed by pre-reaction with the resorcinol, can be added to the mix at this point. This small amount of formaldehyde, representing between about ¼ and ⅓ of the total amount of formaldehyde added to form the final adhesive, serves to link up the ingredients already in the mix. If more than ¼ of the total amount of formaldehyde is added at this point, the resulting mix will be unstable.

At this point in the formulation, the phenol-formaldehyde resin, having a viscosity, pH, solids content and phenol-formaldehyde mole ratio as described hereabove, is reacted with the mix. The phenol-formaldehyde resin represents between 75 and 88% by weight of the total resin solids. If too little phenolic resin is used, the resorcinol content is proportionately too high and the mix becomes too reactive. If too much phenolic resin is used, the adhesive mix is slow in reactivity and the press time and temperature must be increased.

The reaction between the phenolic resin solution and the other ingredients of the formulation generally takes between about 5 and 50 minutes, depending upon the particular phenolic resin used. The mix is then rapidly cooled to room temperature; it has a pH of 10–12, a viscosity of 1500 to 7000 cps. and a resin solids content of 18–26% by weight. A formulation thus prepared is very stable at room temperature and is useful after two to three weeks.

In order to obtain proper performance of the adhesive mix, additional formaldehyde must be added. The amount of formaldehyde added is dependant on the type of phenolic resin used, the particular hot-cooked mix schedule, and the amount of resorcinol which was added. The total amount of formaldehyde added to the mix ranges between 3.5 and 20% by weight, preferably between about 8–12% by weight, based upon the weight of total resin solids. This amount of formaldehyde, which includes that optionally added along with the resorcinol, is sufficient to form a water-insoluble, infusible resin during the curing of the adhesive. The formaldehyde can be added as aqueous 37% Formalin or as paraformaldehyde. After the formaldehyde has been added, the mix is useful for at least two to three days.

My invention is further illustrated by the following examples. In the examples, the word "parts" is used to refer to parts by weight.

EXAMPLE I

A 50% aqueous solution of sodium hydroxide, 210 parts, and 363 parts of water were mixed for two to three minutes, during which time the temperature rose to 40–50° C. The pH of the aqueous solution was 13.5 at 47° C. Wheat flour, 50 parts, was then added and the temperature was raised to 60° C. over the next six to seven minutes with stirring to cream out the mix. An additional 375 parts of water was added during this time and the temperature was raised to 70° C. At this point 300 parts of Douglas fir powdered bark extract, available commercially as Silvacon 472, was added. The resulting, dry, crumbling mix, pH 13.4 at 50° C. was stirred for four minutes while raising the temperature to 80° C. Soda ash, 60 parts, and diesel oil, 6 parts, were added and the temperature was raised to 85° C. The resulting mix, which had a pH of 12.6, was stirred for two minutes. An additional 200 parts of water was then added while maintaining the temperature at 85° C. Ninety parts of industrial-grade resorcinol was added and the mix was stirred for ten minutes. At this point, the mix had a pH of 10.7 at 79° C. and a viscosity of 18,000 cps. at 23° C. Nine-hundred parts of a low-alkaline, low-condensed phenol-formaldehyde resin solution, having a pH of 10.0 at 23° C., a viscosity of 1650 cps. and a resin solids content of 55% by weight, available commercially as PF 550 resin, and containing approximately 1.8 moles of formaldehyde per mole of phenol, was then added to the mix. The mix was cooked for 10–15 minutes and then cooled rapidly to room temperature.

Upon addition of 120–240 parts of 37% Formalin (7.5–15% by weight) or 25–90 parts of paraformaldehyde (4.25–15% by weight) of total resin solids, the mix was ready for use.

EXAMPLE II

The resin adhesive mix prepared in Example I was used to glue five-ply, 5/7" veneer using various closed assembly times and press times. For purposes of certain of the tests the formaldehyde was omitted altogether. In others, varying amounts of paraformaldehyde and Formalin were used. The results are shown below in Table I.

EXAMPLE IV

The procedure of Example I was followed with the exception that the resorcinol was added to the initial aqueous alkaline solution prior to the addition of the wheat flour. Veneer was bonded according to the procedure of Example II. The results are shown in Table III.

*Table I*

MIX 2,600 CPS. AND pH 12

| Test | Parts Resorcinol/100 Parts Resin Solids | Amt.[a] and Type Formaldehyde, Parts/ 100 Parts Resin Solids | Closed Assembly Time in Min. | Press Time at 285° F. | Spread, Lbs./ MDGL [b] | Results 4-Hour Boil [c] | |
|---|---|---|---|---|---|---|---|
| | | | | | | P.s.i. | W.F.,[d] Percent |
| A | 15 | 0 | 10 | 10 | 70 | 208 | 97 |
| B | 15 | 0 | 20 | 10 | 70 | 115 | 98 |
| C | 15 | 0 | 30 | 10 | 80 | 272 | 95 |
| D | 15 | 15 (para) | 10 | 6 | 75 | 166 | 85 |
| E | 15 | 15 (para) | 20 | 6 | 70 | 127 | 98 |
| F | 15 | 15 (para) | 30 | 6 | 70 | 129 | 85 |

SAME MIX STORED OVERNIGHT

| G | 15 | 0 | 10 | 8 | 75 | 249 | 83 |
|---|---|---|---|---|---|---|---|
| H | 15 | 0 | 10 | [e]8 | 75 | 100 | 81 |
| I | 15 | 10 (para) | 10 | 6 | 75 | 252 | 100 |
| J | 15 | 10 (para) | 20 | 6 | 66 | 216 | 100 |
| K | 15 | 10 (para) | 30 | 6 | 70 | 168 | 100 |
| L | 15 | 14.9 (aq. 37%) | 10 | 6 | 62 | 259 | 99 |

[a] Solids basis.
[b] Thousand square feet of double glue line.
[c] Boil 4 hours submerged in water, cool, and break wet.
[d] Wood Failure.
[e] Delaminated at 6 min., put back in press and pressed 2 additional minutes.

A minimum wood failure of 85% makes the adhesive acceptable as exterior-grade.

It is seen from Table I that if the formaldehyde is omitted, a minimum press time of ten minutes at 285° F. is required in order to get an acceptable wood failure. Upon addition of formaldehyde, according to the invention, a wood failure of 100% is obtained using a press time of six minutes at 285° F. It should be noted that satisfactory results are obtained with a closed assembly time as long as thirty minutes.

EXAMPLE III

An adhesive mix was prepared according to Example I with the exception that the amount of resorcinol was reduced to 10% by weight based upon the weight of the total resin solids. This adhesive was tested according to the procedure of Example II.

*Table III*

| Test | Press Time at 300° F. | Results 4-Hour Boil | |
|---|---|---|---|
| | | P.s.i. | W. F., Percent |
| A | 13 mins | Delaminated out of press | |
| B | 8 mins | 76 | 80 |
| C | 6 mins | 92 | 75 |
| D | 5 mins | 148 | 20 |

It is seen from the above table that if the resorcinol is added to the initial reaction mixture, the resulting hot-cooked mix is deficient in reactivity. Test specimen A, which was pressed for 13 minutes, delaminated out of press because the adhesive failed to penetrate the wood.

*Table II*

MIX 4,400 CPS. AND pH 11.6

| Test | Parts Resorcinol/100 Parts Resin Solids | Amt. and Type Formaldehyde, Parts/ 100 Parts Resin Solids | Closed Assembly Time in Min. | Press Time at 285° F. | Spread, Lbs./ MDGL | Results 4-Hour Boil | |
|---|---|---|---|---|---|---|---|
| | | | | | | P.s.i. | W.F., Percent |
| A | 10 | 0 | 10 | 10 | 80 | 237 | 43 |
| B | 10 | 0 | 20 | 10 | 80 | 264 | 25 |
| C | 10 | 0 | 30 | 10 | 75 | 184 | 96 |
| D | 10 | 0 | 10 | 8 | Delaminated out of press | | |
| E | 10 | 5 (para) | 10 | 8 | 70 | 146 | 76 |
| F | 10 | 5 (para) | 20 | 8 | 66 | 196 | 77 |
| G | 10 | 5 (para) | 30 | 8 | 70 | 140 | 0 |

It is seen that a resorcinol-deficient adhesive mix does not provide a satisfactory bonding, with respect to wood failure, if used at press times of less than ten minutes at 285° F.

EXAMPLE V

The procedure of Example I was repeated with the exception that the resorcinol was added just prior to the addition of the Douglas fir bark extract. The resulting adhesive mix was tested according to the procedure of Example II with the following results.

*Table IV*

| Test | Press Time at 300° F. | Results 4-Hour Boil | |
|---|---|---|---|
| | | P.s.i. | W. F., Percent |
| A | 10 mins | Delaminated out of press | |
| B | 8 mins | 184 | 65 |
| C | 6 mins | 126 | 45 |

It is seen that the adhesive mix is deficient in reactivity and fails to give a bond meeting the requirements of wood failure.

EXAMPLE VI

The procedure of Example I was repeated with the exception that the resorcinol was added simultaneously with the phenolic resin. It was found that cooking the mix for a period of time greater than 15 minutes resulted in gelation. If the mix was not cooked or cooked for a period of time less than 15 minutes, the resulting plywood delaminated out of press.

EXAMPLE VII

The procedure of Example I was repeated with the exception that the resorcinol was added after the addition of the phenolic resin. It was found that when resorcinol was added to the hot-cooked mix, the mix gelled instantly. If the mix was cooled after the addition of the phenolic resin body prior to the addition of resorcinol, veneer bonded therewith delaminated out of press.

It is thus seen from Examples IV–VII that it is absolutely necessary to add the resorcinol after the addition of the formaldehyde-reactive filler but before the addition of the phenolic resin. The resin adhesive mix of the invention and its method of preparation are unique in that they represent the first successful addition of resorcinol to a hot-cooked phenol-formaldehyde resin.

EXAMPLE VIII

The procedures of Examples I and II were repeated to determine the effect of increased assembly times and shortened press times at 285° F. The results are shown in Table V.

*Table V*

RESORCINOL (RESIN GRADE) MODIFIED A-550 ADHESIVE [1]
[Press temp. 285° F.]

| Test | Formaldehyde, Parts/100 Parts Resin Solids | Assembly Time (mins.) | Press Time, mins. at 285° F. | Spread Wt., Lbs./MDGL | Results 4-Hour Boil [4] | |
|---|---|---|---|---|---|---|
| | | | | | P.s.i. | W.F., Percent |
| A | 0 | 10 | 10 | 66 | 266 | 80 |
| B [2] | 0 | 10 | 8 | 70 | --- | --- |
| F | 15 | 5 | 6 | 66 | 125 | 98 |
| C | 15 | 10 | 6 | 66 | 196 | 94 |
| D | 15 | 20 | 6 | 62 | 225 | 93 |
| E | 15 | 30 | 6 | 66 | 220 | 99 |
| G | 15 | 10 | 5 | 62 | 196 | 86 |
| H [3] | 15 | 10 | 4 | 70 | --- | --- |

[1] Physical constants of extended mix: pH at 25° C. —10.5. Visc. at 25° C.—2,500 cps. (Brookfield). All panels 5-ply, 1/7" fir veneer at 5% moisture content.
[2] Delaminated on cutting.
[3] Delaminated out of press.
[4] Results: Average of 10 samples—subjected to 4 hours boiling water, cooled and tested wet.

Substantially similar results are obtained if the resorcinol content of the resin is varied between 12 and 25% by weight based on the weight of total resin solids.

EXAMPLE IX

The procedure of Example I was followed with the exception that the quantities used were scaled up for the preparation of the mix in a 15-gallon kettle and the low-alkaline, low-condensed phenol-formaldehyde resin was prepared as follows: 90% phenol, 37.5 pounds, and 50% aqueous sodium hydroxide, 11 pounds, were charged to a kettle to which 37% aqueous formaldehyde, 58.5 pounds, was added and the kettle was closed. The initial pH of the charged reactants was 10.47 at 25° C. Agitation was commenced and the temperature was raised to 80° C. where the exotherm brought the mixture to reflux. The solution was refluxed gently under agitation for 81 minutes at 100–103° C., cooled for 15 minutes and discharged. The resulting resin solution had a pH of 10.6 at 25° C., a viscosity of 1000 cps. at 25° C., infinite dilutability and resin solids content of 48%. The resin contained two moles of formaldehyde for each mole of phenol.

Three large batches of adhesive containing 7.5, 9.3 and 11.2 parts formaldehyde per 100 parts of total resin solids were prepared and used on five-ply Douglas fir veneer 1/7" thick of 4% moisture content to prepare 2' x 4' plywood panels in a 37" x 54" steam press. All panels were pressed at 175 p.s.i. for six minutes at 285° F. One panel each was made at long and short closed assembly times. The results are shown below in Table VI.

*Table VI*

| Condition Varied | | Results, p.s.i.—W.F., percent | | |
|---|---|---|---|---|
| Formaldehyde, Level Parts/100 Parts Resin Solids | Closed Assembly | Dry | Cyclic* Boil | Cold* Soak |
| 7.5 | Short | 300—30 | 141—25 | 225—20 |
| | Long | 270—85 | 180—90 | 225—90 |
| 9.3 | Medium | 330—72 | 245—75 | 255—75 |
| 11.2 | Short | 290—90 | 190—85 | 205—99 |
| | Long | 285—45 | 160—30 | 190—25 |

*Core—glue line tested according to Adhesives Policy of the Douglas Fir Plywood Association (DFPA) effective January 1, 1962.

It is seen that 11.2 parts of formaldehyde per hundred parts resin solids gave best results. All results at short assembly are passing, i.e. 85% minimum wood failure. Best results were obtained at long assembly times, but the mix was too thin because it was very fresh, thus overpenetrating and starving the glue line. The results indicated that a short aging period was required using longer closed assembly times.

EXAMPLE X

An adhesive was prepared according bto the procedure of Example IX using 11.2 parts of formaldehyde per hundred parts resin solids. Panels, five-ply, 1/7" veneer, 16" x 16", were made by pressing for six minutes at 285° F. at 175 p.s.i. The moisture content of the veneer was varied from 0–12% by weight and the closed assembly time was varied from 0–30 minutes. The results are shown in Table VII.

*Table VII*

| Closed Assembly Time, mlns. | Results, p.s.i.—W.F., percent | | | |
|---|---|---|---|---|
| | Moisture Content 0% | Moisture Content 4% | Moisture Content 8% | Moisture Content 12% |
| 0 | 197—100 | 261—95 | 210—89 | 220—110 |
| 10 | 162—85 | 237—100 | 202—92 | 196—95 |
| 20 | 183—40 | 175—74 | 199—92 | 184—65 |
| 30 | 52—0 | 185—60 | 202—100 | 168—65 |

These data show that on very dry veneer (0% moisture content) the longer assemblies are poor; the veneer is so dry it "sucks out" the glue and starves the joint. At 4–8%, performance is better; the bonding passes all specifications at 8% and at normal assemblies (0 to 10 minutes) even on 12% moisture content. Performance drops off at 20–30 minutes closed assembly time on very wet (12%) veneer.

This performance far exceeds phenolic adhesives; they simply will not operate above 4% moisture content or above 20 minutes closed assembly time.

EXAMPLE XI

The procedure of Example X was repeated and tests were made to determine the effect of varying the closed assembly time with other conditions chosen being optimum. All panels were five-ply, ¼" veneer, 4% moisture content, 2' x 4' panels pressed six minutes at 285° F. at 175 p.s.i. All mixes mixed 10–15 minutes prior to use with 11.2 parts formaldehyde per 100 parts resin solids added. Spread rate controlled at 55±5 lbs./MDGL.

The panels were prepared as follows: The 30, 15 and 5 were laid up with mix No. 1 and pressed after appropriate asembly times. The 25, 10 and 20 were then laid up in that order, with no additional glue being added to spreader until after the panel whose assembly was 25 had been made. The time the adhesive was on the rolls for this panel was one hour and 13 minutes. The results are shown in Table VIII.

*Table VIII*

| Closed Assembly Time, min. | Results, p.s.i.—W. F., percent | | |
|---|---|---|---|
| | Dry | Cycle Boil | Cold Soak |
| 5 | 265—100 | 180—95 | 190—100 |
| 10 | 260—100 | 180—95 | 207—90 |
| 15 | 330—100 | 195—100 | 235—100 |
| 20 | 320—100 | 205—95 | 235—100 |
| 25 | 295—100 | 170—90 | 170—85 |
| 30 | 235—100 | 150—95 | 155—100 |

It is seen that the adhesive bonds satisfactorily using a closed assembly time of 30 minutes. The permissible assembly time for most commercial adhesives will not exceed 20 minutes. Moreover, the gluings reported in Table VIII were made at 85–95° F. ambient temperature using low spreads; all commercial adhesives use heavier spreads at temperatures over 85° F. and specify that the assembly time must be shortened, in other words, they warn the users that they must speed up and get the panels into the press or use a heavy spread to prevent the glue from drying out.

EXAMPLE XII

An adhesive prepared according to the procedure of Example II was use to bond Douglas fir veneer, varying the press times, temperatures, thickness of the spread and allowing "fry time" on the hot platens. A phenolic adhesive mix prepared according to a substantially identical procedure with the omission of the resorcinol was used as a control. All panels were five-ply, ¼" veneer at 4% moisture content, 2' x 4' pressed at 175 p.s.i. using 11.2 parts formaldehyde per hundred parts resin solids in the resorcinol mixes. The results are shown in Table IX.

*Table IX*

| Test | Condition of Test | Results, p.s.i.—W.F. Percent [a] | | |
|---|---|---|---|---|
| | | Dry | Cycle Boil | Cold Soak |
| A | 6 min. at 270° F., 25 min. C.A.T. [b][c] | 305—100 | 225—75 | 215—85 |
| B | 6 min. at 270° F., 10 min. C.A.T. | 245—100 | 165—95 | 190—95 |
| C | 5 min. at 285° F., 10 min. C.A.T. | 315—98 | 215—95 | 260—90 |
| D | 4.5 min. at 285° F., 10 min. C.A.T. | 300—95 | 200—80 | 200—60 |
| E | 2.5 min. fry time plus 6 min. at 285° F. | 295—95 | 195—95 | 230—85 |
| F | Heavy spread (75±5 lbs./MDGL), 30 min. C.A.T. | 320—95 | 170—70 | 200—90 |
| G | Heavy spread, 10 min. C.A.T. | 375—95 | 205—85 | 260—95 |
| H | Straight phenolic control (no resorcinol), 6 min. at 300° F., 10 min. C.A.T. | Delaminated out of press | | |
| I | Straight phenolic control (no resorcinol), 10 min. at 300 ° F., 10 min. C.A.T. | 275—100 | 135—100 | 185—95 |

[a] DFPA specifications.
[b] Closed assembly time.
[c] Tests A–E, spread 55±5 lbs./MDGL.

The above data indicate that the adhesive of the invention will bond effectively at normal assembly times and temperatures of 270–285° F. The time can be reduced from six minutes to five minutes satisfactorily. Test E, allowing for 2.5 minutes fry time on the hot platens, shows that if trouble develops during manufacture, the operators have at least 2.5 minutes to correct the difficulty; the other panels can fry on the platens for this length of time without deleterious effect. Heavy spreads can be tolerated at normal assembly times. The control tests show that the straight phenol-formaldehyde resin adhesive mix prepared by a substantially identical procedure, with the omission of the resorcinol, performs well using 10 minute press time at 300° F., but is totally unsatisfactory when pressed for only six minutes at 300° F.

I claim:

1. In the preparation of a resorcinol-modified phenolic resin adhesive mix made from a low-condensed phenol-formaldehyde resin, a formaldehyde-reactive filler and resorcinol, the improved method of formulation comprising heating 1 part by weight resorcinol with 2.75–5.5 parts by weight formaldehyde-reactive cellulosic filler in aqueous alkaline medium of a pH of at least 12 at an elevated temperature below the boiling point of the reaction mixture, reacting said reaction mixture with 3–7.33 parts by weight of a low-alkaline, low-condensed phenol-formaldehyde resin in aqueous solution, said solution being characterized by a pH of 8–11 and a viscosity of 200–3000 cps. at 23° C., allowing the resulting mixture to react at an elevated temperature below the boiling point of said mixture, and adding water of dilution during the formulation to provide a final adhesive mix having a resin solids content of 18–26% by weight.

2. In the preparation of a resorcinol-modified phenolic resin adhesive mix made from a low-condensed phenol-formaldehyde resin, a formaldehyde-reactive filler and resorcinol, the improved method of formulation comprising heating 1 part by weight resorcinol with 2.75–5.5 parts by weight formaldehyde-reactive cellulosic filler in aqueous alkaline medium of a pH of at least 12 at a temperature of 50–98° C., reacting said reaction mixture with 3–7.33 parts by weight of a low-alkaline, low-condensed phenol-formaldehyde resin in aqueous solution, said solution being chaacterized by a pH of 8–11 and a viscosity of 200–3000 cps. at 23° C., allowing the resulting mixture to react at an elevated temperature below the boiling point of said mixture, and adding water of dilution during the formulation to provide a final adhesive mix having a resin solids content of 18–26% by weight.

3. A resorcinol-containing phenolic resin adhesive mix, characterized by a viscosity of 1500–7000 cps. at 23° C., a pH of 10–12 and a total resin solids content of 18–26% by weight, prepared by the sequence of steps comprising:
 (a) providing an aqueous alkaline solution containing sufficient caustic to provide a resin adhesive mix of pH 10–12, the amount of water present being sufficient to provide a stirrable mixture during the formulation of the mix,
 (b) adding thereto a formaldehyde-reactive cellulosic filler in an amount of 33–67% by weight based on the weight of said total resin solids,
 (c) adding thereto soda ash in an amount sufficient to lower the pH of the mix and to cream out the mix upon addition of water of dilution,
 (d) adding thereto resorcinol in an amount of 12–25% by weight based on the weight of said total resin solids,
 (e) allowing the mixture to react at an elevated temperature below the boiling point of the mixture,
 (f) adding thereto an aqueous low-alkaline, low-condensed phenol-formaldehyde resin solution, characterized by a pH of 8–11 and a viscosity of 200–3000 cps. at 23° C., the amount of said resin being 75–88% by weight, based on the weight of said total resin solids,
 (g) allowing the mixture to react at an elevated temperature below the boiling point of said mixture,
 (h) cooling the mixture to ambient temperature, and
 (i) adding sufficient formaldehyde to form a water-insoluble, infusible resin during the curing of the adhesive,
the total water of dilution added during the sequence of steps being that required to provide a final adhesive mix having a resin solids content of 18–26% by weight.

References Cited by the Examiner
UNITED STATES PATENTS

| | | | |
|---|---|---|---|
| 2,489,336 | 11/49 | Spahr et al. | 260—29.3 |
| 2,878,197 | 3/59 | Baxter et al. | 260—17.2 |
| 3,053,784 | 9/62 | Herrick et al. | 260—17.2 |

WILLIAM H. SHORT, *Primary Examiner.*

JAMES A. SEIDLECK, *Examiner.*